Patented May 6, 1924.

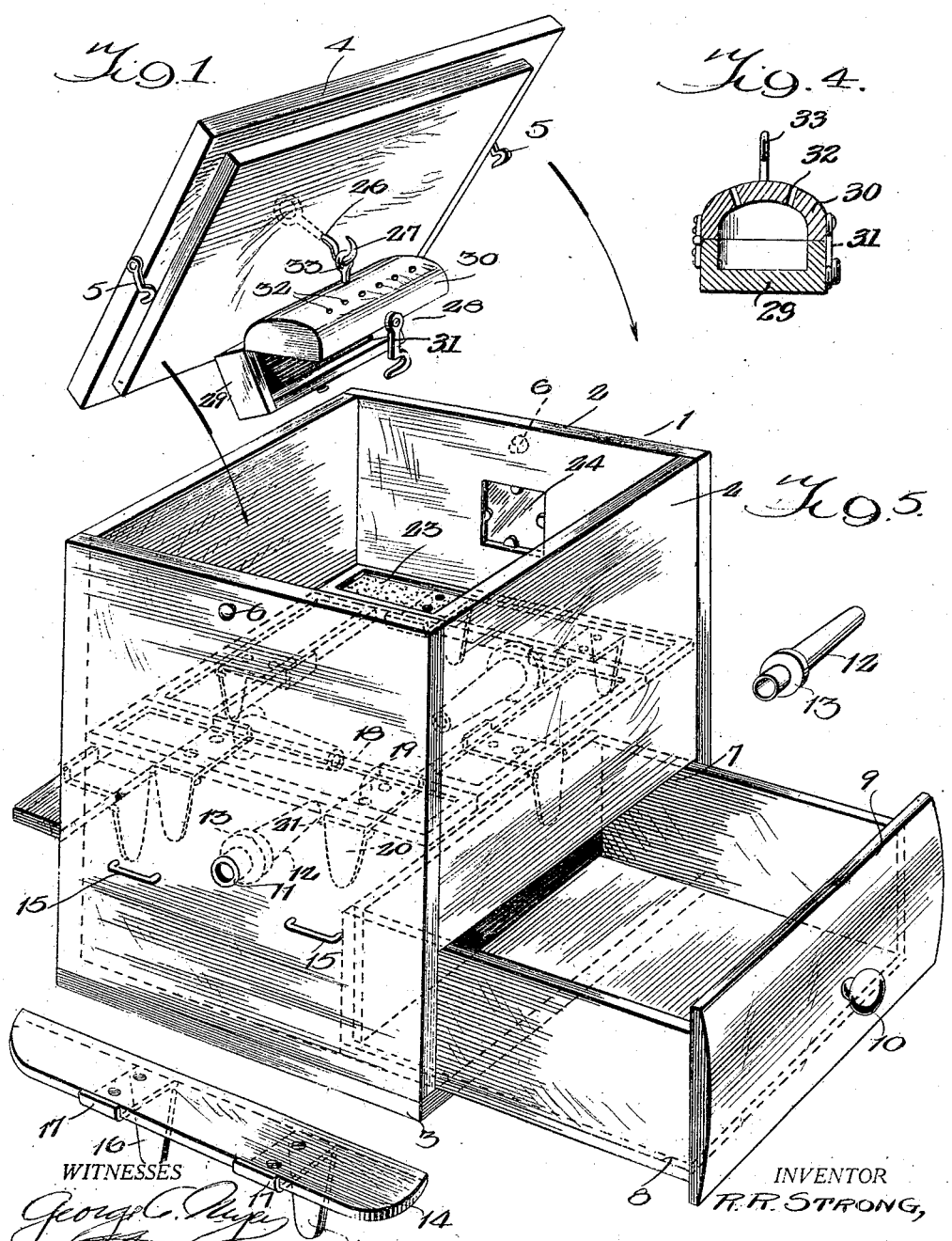

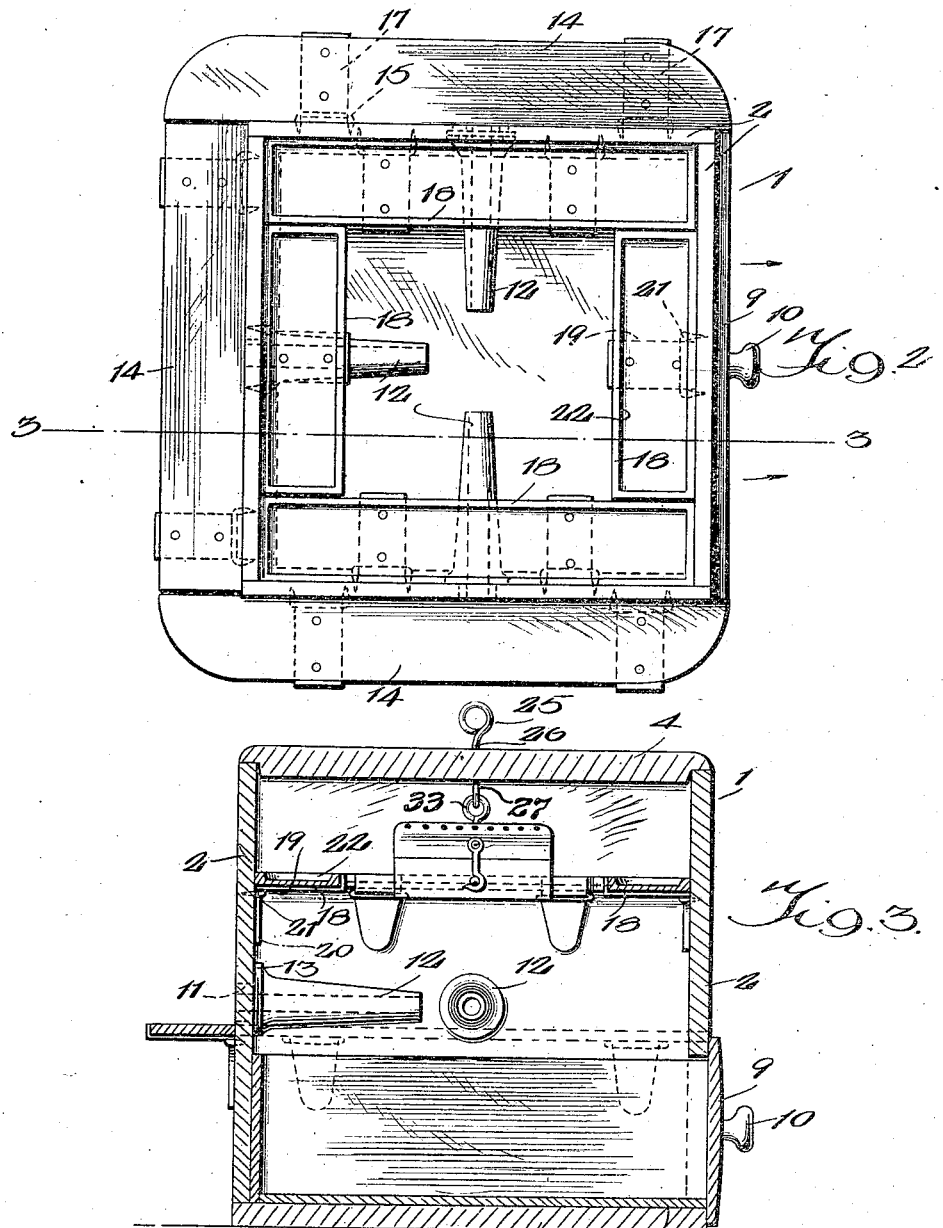

1,493,132

UNITED STATES PATENT OFFICE.

RUSSELL ROBERT STRONG, OF ANACONDA, MONTANA.

INSECT TRAP.

Application filed August 24, 1923. Serial No. 659,193.

*To all whom it may concern:*

Be it known that I, RUSSELL ROBERT STRONG, a citizen of the United States, and resident of Anaconda, in the county of Deerlodge and State of Montana, have invented certain new and useful Improvements in Insect Traps, of which the following is a specification.

My invention relates to improvements in insect traps, and it consists in the combinations, constructions and arrangements herein described and claimed.

An object of the invention is to provide a simple and reliable device which affords facilities for effecting the extermination of flies and like insects in a thoroughly sanitary manner.

A further object of the invention is to provide a device of the character described which provides a case into which the flies or like insects may be lured and confined, means being associated with the case for holding a substance poisonous to the imprisoned insects in a position accessible to the insects and removable means being associated therewith for receiving the dead insects, whereby the latter may be quickly and conveniently removed from the case and disposed of in any suitable manner.

Other objects and advantages will be apparent from the following description, considered in conjunction with the accompanying drawings, in which—

Figure 1 is a perspective view showing a trap embodying the invention, certain of the elements of the trap being shown separated from one another and a drawer which is comprised in the trap being shown in open position, Figure 2 is a top plan view of the body of the trap, the cover therefor being omitted, Figure 3 is a vertical section through the trap with a cover or lid placed on the body thereof, the view being taken along the line 3—3 of Figure 2, Figure 4 is a transverse section through a container comprised in the device for holding a lure for the insects, and Figure 5 is a perspective view of one of the inlets of the trap detached from the body of the latter.

In carrying out my invention, I provide a box-like case designated generally at 1 which comprises a body formed of a plurality of vertically disposed substantially rectangular members 2 and a substantially rectangular bottom 3 secured together in any suitable known manner to provide a chamber therewithin, which chamber may be closed at its upper end through the agency of a removable cover or lid 4 which is comprised in the case and is adapted to fit upon the body of the case at the upper end of the latter. The lid 4 may be releasably held in position to close the chamber within the body of the case at the upper end of the latter by means of any suitable fastening devices such as the hooks 5 carried by the lid for engaging stud projections 6 carried by the vertical members of the body of the case.

One of the vertical members 2 of the body of the case is provided with an opening 7 in the lower part thereof through which a drawer 8 may be inserted to extend interiorly of the case until the outer end 9 of the drawer interfits and closes the opening 7. The drawer 8 may be withdrawn from inserted position in the case at will to the position shown in Figure 1 and a knob 10 or other handle may be provided on the outer end 9 of the drawer for convenience in manipulating the latter.

Each of the remaining vertical members of the body of the case is provided with an opening 11 located above the level of the upper end of the opening 7 and receiving the outer end portion of a tubular inlet member 12, the latter being provided with an annular enlargement or flange 13 for engaging with the inner face of the vertical member 2 when the outer end of the tubular inlet member is flush with the outer end of the opening 11, whereby the major portion of the tubular inlet member 12 will be supported interiorly of the body of the case. A shelf 14 is associated with each of the inlet members 12 and is removably supported on one of the vertical members 2 against the outer face of the latter through the agency of a pair of horizontally aligned substantially U-shaped guiding and retaining clips 15 carried by the vertical members 2 and the depending arms 16 of brackets 17 which are secured to the shelf 14, the depending arms 16 of the brackets tapering in width toward their lower ends and being adapted to engage with the clips carried by the vertical members 2 in such manner as to support the shelf 14 with the upper face thereof level with the lower side of the bore of the corresponding inlet member 12 and with the inner edge of the shelf 14 in abutting relation to the outer face of the vertical member 2.

The case also is provided with a plurality of inner shelves 18 which are removably supported interiorly of the case above the level of the inlet members 12 through the agency of brackets 19 carried by the shelves and having depending arms 20 engaging substantially U-shaped clips 21 which protrude from the inner faces of certain of the vertical members 2.

Each of the shelves 18 thus will be horizontally disposed within the case and each shelf 18 is formed to provide a depression or cavity 22 in its upper face for the reception of a suitable substance poisonous to flies and like insects which substance may be a powder as indicated at 23 in Fig. 1. The case 1 may be provided with a window 24 in the upper part of one of the vertical members 2 above the level of the shelves 18.

The lid 4 preferably is provided with a handle by means of which the lid may be conveniently removed from and replaced on the body of the case. This handle may have the form of a loop or ring 25 at the upper end of a shank 26 which extends vertically through the lid 4 centrally thereof and has the lower end portion thereof fashioned to provide a hook 27 from which a bait receiving box 28 may be suspended to hang within the case when the lid is in closed position at a level approximately the same as the inner shelves 18. The bait holding box 28 preferably comprises a body 29 having a lid 30, the body and the lid being provided with cooperative fastening means, such as indicated at 31 whereby the lid may be releasably held in closed position. The lid 30 is provided with perforations 32 and carries a screw eye 33 for engaging with the hook 27 to support the bait holding box from the lid 4 in the manner described.

From the foregoing description of the various parts of the device, the operation thereof may be readily understood. Any suitable substance which will give off odors attractive to insects may be placed within the bait holding box 28. For example, a piece of partially decomposed meat may be placed therewithin. The lid 4 then is placed in closed position and secured to the body of the case and the drawer 8 also is closed. The insects attracted by the odor from the lure alight on the outer shelves 14 and thence move through the tubular inlet members 12 into the interior of the case. Being unable to gain access to the bait within the box 28, the insects will alight on the inner shelves 18 and the poisonous substance thereon will cause the death of the insects. The lid 4 may be removed at suitable intervals and the dead flies brushed from the shelves 18 into the drawer 8 which also may be removed when desired and carried to any place suitable for disposing of the dead insects.

It will be manifest from the foregoing that my device provides means for causing the extermination of insects in a thoroughly sanitary manner since the insects which are affected by a substance poisonous to such insects are confined and are not permitted to fly or crawl into or onto various articles before their death ensues. Moreover, the substance which is poisonous to the insects is held in a position accessible to the insects but inaccessible to small children and in a position from which it cannot be displaced to fall into food substances which may be adjacent thereto.

Obviously, my invention is susceptible of embodiment in forms other than that illustrated in the accompanying drawing and I therefore consider as my own all modifications and adaptations of the form of the device herein described which fairly fall within the scope of the appended claims.

Having thus described the invention, what is claimed is:—

1. A fly trap comprising a box-like case consisting of a body having vertical side walls connected together and a bottom connected to the vertical walls, and a lid for holding the body of the case at the upper end of the latter, said case being provided with a lateral opening in the lower part thereof, a drawer adapted to slide in said opening and having the outer end portion thereof adapted to close said lateral opening when the drawer has been inserted within the case, said case also having an opening in a vertical wall thereof located at a level higher than the upper end of said first named lateral opening, a tubular inlet member having the outer end portion thereof supported in said second named opening and extending into the case, means within the case for supporting a substance poisonous to insects, a shelf removably supported against an outer face of said case in position to constitute an approach to said inlet member, and means for supporting a lure for enticing insects to enter the case through said inlet member.

2. A trap of the character described comprising a box-like case including a removable lid and having a lateral opening in the lower part thereof, a drawer normally interfitting the lower portion of said case and having a portion then closing the lateral opening of the case, said case also having a second lateral opening located above the level of the first named lateral opening, a tubular inlet member having the outer end portion thereof supported within said second named lateral opening and protruding interiorly of the case, a shelf removably supported upon the case in position to constitute an approach to the outer end of said inlet member, an inner shelf removably supported within the case above the level of said inlet member, said inner shelf having a depression in the upper face thereof for receiving and supporting a substance poisonous to insects, and means for supporting within the case a substance for giving off odors attractive to the insects.

RUSSELL ROBERT STRONG.